United States Patent
van der Hoeven

(10) Patent No.: US 6,353,272 B1
(45) Date of Patent: Mar. 5, 2002

(54) ROTOR SHAFT FOR A ROTARY MACHINE AND ROTARY MACHINE PROVIDED WITH A ROTOR SHAFT OF THIS KIND

(75) Inventor: Pieter van der Hoeven, Hengelo (NL)

(73) Assignee: Delaval Stork V.O.F., Hengelo (NL)

( * ) Notice: Subject to any disclaimer, the term of this patent is extended or adjusted under 35 U.S.C. 154(b) by 0 days.

(21) Appl. No.: 09/451,519

(22) Filed: Nov. 30, 1999

Related U.S. Application Data

(63) Continuation of application No. PCT/NL98/00303, filed on May 27, 1998.

(30) Foreign Application Priority Data

May 30, 1997 (NL) .............................................. 1006177

(51) Int. Cl.[7] .......................... H02K 21/00; F16C 33/00; F16N 13/00
(52) U.S. Cl. .......................... 310/90; 310/91; 310/60 A; 310/261
(58) Field of Search ............................ 310/90, 91, 261, 310/262, 67 R, 64, 60 A, 65; 384/309, 406, 409, 114, 107, 122, 124; 241/86.1, 275, 91

(56) References Cited

U.S. PATENT DOCUMENTS

| | | | |
|---|---|---|---|
| 3,542,441 A | 11/1970 | Nixon | 308/73 |
| RE30,919 E | * 5/1982 | Sautter | 241/86.1 |
| 4,471,652 A | * 9/1984 | Yasuhara et al. | 73/116 |
| 4,664,595 A | 5/1987 | Tsuji et al. | 415/170 R |
| 5,154,009 A | 10/1992 | Kade et al. | 34/108 |
| 5,321,329 A | 6/1994 | Hovorka | 310/90.5 |

FOREIGN PATENT DOCUMENTS

| | | | |
|---|---|---|---|
| CH | 492138 | | 6/1970 |
| DE | 3734524 | | 4/1989 |
| FR | 2028316 | | 10/1970 |
| GB | 1244913 | | 9/1971 |
| JP | 57 05018 | | 3/1982 |
| JP | 57-040120 A | * | 3/1982 |
| NL | 87 06 954.7 | | 8/1987 |

OTHER PUBLICATIONS

F.M. de Jongh and P.G. Morton., "The Synchronous Instability of a Compressor Rotor due to Bearing Journal Differential Heating" The American Society of Mechanical Engineers, Presented at the International Gas Turbine and Aeroengine Congress and Exposition Jun. 13–16, 1994; pp 1–13.

* cited by examiner

Primary Examiner—Tran Nguyen
(74) Attorney, Agent, or Firm—Stroock & Stroock & Lavan LLP

(57) ABSTRACT

A rotor shaft for a high speed rotary machine has bearing parts which, after being fitted in the machine, are held in oil-lubricated sliding-contact bearings. The rotor shaft is provided, in the region of at least one bearing part, with an outer casing having a cylindrical outer surface which forms, in the region of the the bearing part, the outer surface of the rotor shaft. The outer casing comprises a separate, one-piece cylindrical sleeve arranged directly on the shaft part situated inside the sleeve and forming a structural unity therewith. The contact surface between the sleeve and the shaft part situated inside the sleeve has a cylindrical shape. The cylindrical sleeve forms a thermally insulating layer between the outer surface of the sleeve and the shaft situated inside the sleeve.

12 Claims, 1 Drawing Sheet

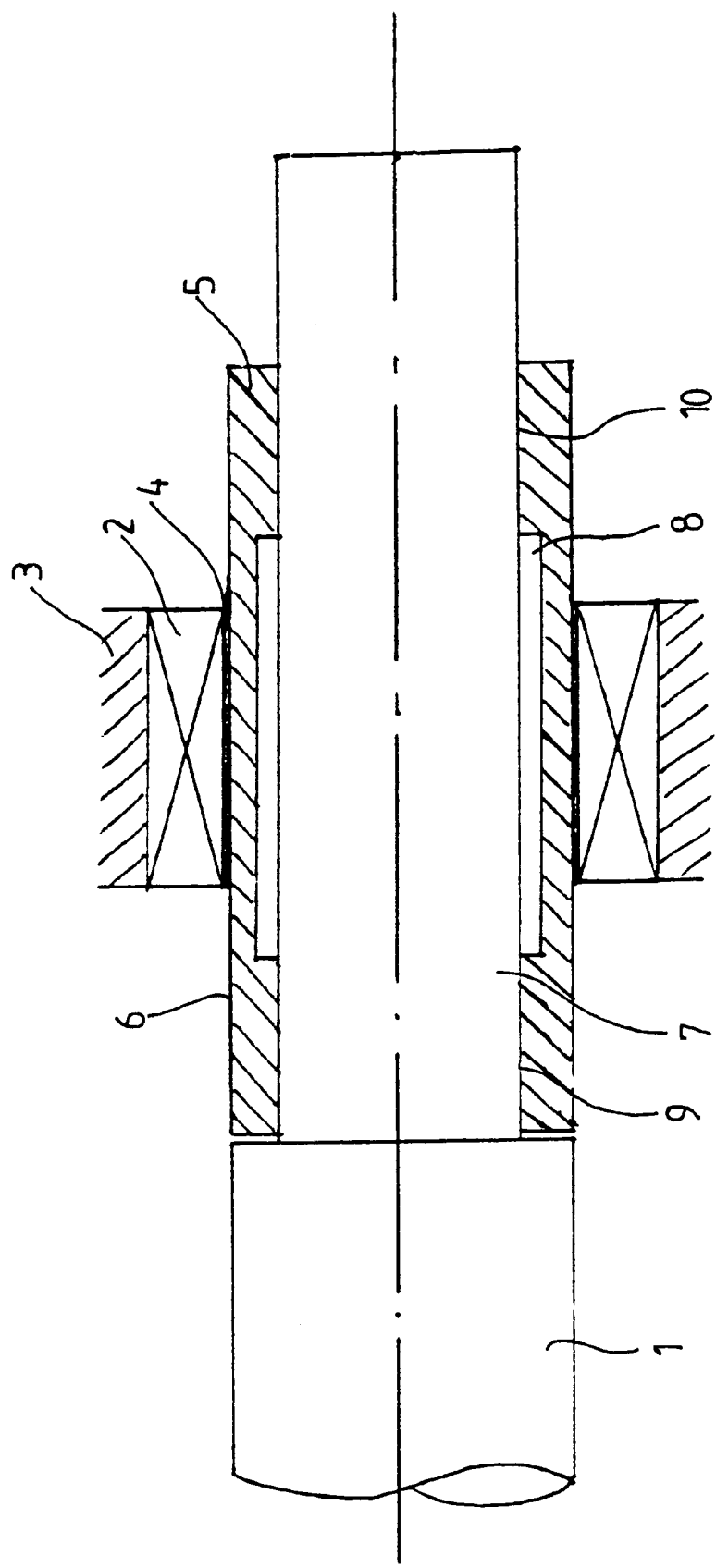

ROTOR SHAFT FOR A ROTARY MACHINE AND ROTARY MACHINE PROVIDED WITH A ROTOR SHAFT OF THIS KIND

CROSS-REFERENCE TO RELATED APPLICATIONS

This is a continuation application of PCT/NL98/00303 filed May 27, 1998.

BACKGROUND OF THE INVENTION

The invention relates to a rotor shaft for a rotary machine, which rotor shaft has bearing parts which, after being fitted in the machine, are held in oil-lubricated sliding-contact bearings.

Rotor shafts of this kind are known in rotary machines, such as steam turbines, gas turbines, centrifugal pumps, boiler feed pumps, axial compressors and centrifugal compressors. Rotary machines of this kind frequently operate at high rotational speeds, which in the case, for example, of centrifugal compressors may lie between 3000 and 18,000 revolutions per minute.

A problem which may arise in rotary machines where the rotor shaft rotates at such high speeds is synchronous instability of the rotor shaft, leading the machine to vibrate. The cause of this synchronous instability of the rotor shaft is that at relatively high speeds of the rotor shaft a temperature difference is produced diametrically across the shaft at the location of the bearings. Such a temperature difference causes the rotor shaft to bend slightly at the location of the bearing, resulting in imbalance and consequently vibrations. This process can amplify itself, with the result that synchronous rotor instability may arise.

This phenomenon has been investigated by F. M. de Jongh and P. G. Morton and has been described in ASME article 94-GT-35: "The synchronous instability of a compressor rotor due to bearing journal differential heating".

Applicant has carried out measurements on a rotor shaft supported directly in bearing cups according to the state of the art. At the location of the bearing an average shaft temperature of about 50 to 70° C. and a diametrical temperature difference over the shaft of about 10 to 15° C. was measured.

SUMMARY OF THE INVENTION

The object of the invention is to eliminate the problem of temperature-induced instability and the resultant vibrations of the rotor shaft in rotary machines.

This object is achieved according to the invention by the fact that the rotor shaft is provided, in the region of at least one bearing part, with an outer casing which forms a thermally insulating layer between the outer surface of the rotor shaft and that part of the shaft which is situated inside the outer casing, said outer casing comprising one single, separate, cylindrical sleeve arranged on the shaft part situated inside the outer casing and forming a structural unity therewith, said sleeve having a cylindrical outer surface which forms, in the region of the bearing part, the outer surface of the rotor shaft.

This measure has been found to eliminate the problem of temperature-induced bending of the rotor shaft, with the result that the problem of temperature-induced instability of the rotor shaft no longer occurs.

It is known per se to provide a rotor shaft, at the location of a bearing, with a thermally insulating layer (see for example DE-U-8706954 and DE-A-3734524). However, these constructions are often complicated and, moreover, have a totally different purpose than the construction according to the invention.

The invention also relates to a rotary machine provided with a rotor shaft according to the invention.

The invention will be explained in the following description of an exemplary embodiment with reference to the drawing.

BRIEF DESCRIPTION OF THE DRAWING

The single FIGURE diagrammatically depicts a section of a preferred embodiment of a rotor shaft according to the invention in the region of a bearing.

DETAILED DESCRIPTION OF THE PREFERRED EMBODIMENTS

The FIGURE diagrammatically depicts a section of a rotor shaft 1 of a rotary machine. In this case, this is an end section of the rotor shaft 1, also referred to as the axle journal. This end section of the rotor shaft 1 comprises a bearing part which is supported by means of a diagrammatically depicted sliding-contact bearing 2 in the bearing housing 3, which is likewise diagrammatically depicted, of the rotary machine. The bearing 2 is lubricated with oil, which forms a thin film 4 between the inner surface of the bearing 2 and the outer surface of the shaft. In the region of the bearing 2, the rotor shaft 1, i.e. the bearing part, is provided with an outer casing 5 which forms a thermally insulating layer between the outer surface 6 of the outer casing 5 and that part 7 of the shaft which is situated inside the outer casing 5. This outer casing prevents the problem of temperature-induced instability, as described in the above-mentioned article by De Jongh and Morton, from occurring.

In the embodiment illustrated, the casing 5 comprises one single, separate, cylindrical sleeve 5 arranged on the rotor shaft 1. The sleeve 5 forms with the shaft part 7, so to speak, a structural unit. The outer surface 6 of the sleeve 5 forms, in the region of the bearing part, the outer surface of the rotor shaft 1.

The sleeve 5 has a larger internal diameter in the axially central region than in the region of the ends, so that a chamber 8 is formed between the sleeve 5 and the shaft part 7. The air present in this chamber 8 forms an insulating layer between the sleeve 5 and the shaft part 7. An alternative insulating medium may, for example, be oil. As a result, any temperature difference produced across the diameter at the location of the bearing 2 has no effect on the shape of the rotor shaft 1.

The sleeve 5 is designed such that it is sufficiently stiff and rigid to be able to receive the bearing forces, such that radial deformations causing instabilities do not occur.

Preferably, the sleeve 5 is shrunk onto the rotor shaft 1 in the region of the ends, in which case it is expedient for the shrunk connection 9 at one end to be tighter than the shrunk connection 10 at the other end, in order to provide freedom for temperature dilation.

It is advantageous to make the sleeve 5 from the same material (steel) as the rotor shaft. If this is so, the running properties of the material of the sleeve in the oil region in the bearing are known and predictable. Furthermore, this has the advantage that then both the sleeve and rotor shaft part located therein have the same thermal coefficient of expansion, so that undesired, temperature-dependent stresses between shaft and sleeve are prevented. This advantage can, of course, also be achieved by using different materials which have nearly the same thermal coefficient of expansion.

It is also possible to form a chamber between the sleeve and that part of the shaft situated inside it by providing the shaft inside the sleeve with a smaller diameter at the location of the axially central region of the sleeve than in the region of the ends of the sleeve.

Furthermore, it is possible to make the sleeve from an insulating material, which is, however, preferably not a ceramic material, since this to brittle. With a sleeve from insulating material, it is possible to negate the effect of temperature differences across the diameter, at the location of the bearing, on the shape of the rotor shaft 1. In that case, the sleeve does not have to be provided with a recess, as in the sleeve 5 shown in the drawing.

Yet another option is to make the sleeve from a material which does not expand when the temperature rises, such as for example "Invar".

A rotor bearing according to the above-described exemplary embodiment of the figure is used in a centrifugal compressor.

The machine was first tested with a conventional rotor shaft, without sleeve, and therefore without thermally insulating layer. In this machine, at 7000 revolutions per minute the temperature-induced instability was such that the rotational speed of the machine had to be reduced.

Then, the machine-bearing was changed by reducing the diameter of the rotor shaft part in question and providing it with a sleeve according to the invention. In this way, the machine reached its specified maximum speed of 10,400 revolutions per minute without the occurrence of temperature-induced instability. Higher rotational speeds were not tested here, but it would seem justifiable to reach the conclusion that temperature-induced vibrations and instability are completely ruled out at all rotational speeds in a rotary machine according to the invention.

What is claimed is:

1. A rotor shaft high speed rotary machine, said rotor shaft having at least one bearing part which, after being fitted in the machine, held in oil-lubricated sliding-contact with a bearing and the bearing part being provided with an outer casing having a cylindrical outer surface which forms, in the region of the bearing part, an outer surface of the rotor shaft, the outer casing comprising a separate, one-piece cylindrical sleeve arranged directly on a portion of the rotor shaft situated inside the sleeve and forming a structural unity therewith, a contact surface being formed between the sleeve and the portion of the rotor shaft situated inside the sleeve, the contact surface having a cylindrical shape, the cylindrical sleeve forming a thermally insulating layer between the outer surface of the sleeve and the portion of the rotor shaft situated inside the sleeve.

2. The rotor shaft of claim 1, wherein the sleeve has a larger internal diameter in an axially central region than in a region of the ends, so that a chamber is formed between the sleeve and the portion of the rotor shaft situated inside the sleeve.

3. The rotor shaft of claim 1, wherein the portion of the rotor shaft situated inside the sleeve located at an axially central region of the sleeve has a smaller diameter than in a region of the ends of the sleeve, so that a chamber is formed between the sleeve and the portion of the rotor shaft situated inside the sleeve.

4. The rotor shaft of claim 2, wherein the sleeve is shrunk onto the portion of the rotor shaft situated inside the sleeve in the region of the ends thereof to form a shrunk connection at each of the ends.

5. The rotor shaft of claim 4, wherein the shrunk connection at one end of the sleeve is tighter than the shrunk connection at the other end.

6. The rotor shaft of claim 2, wherein the sleeve is made from the same material as the rotor shaft.

7. A high speed rotary machine provided with a rotor shaft having at least one bearing part which, after being fitted in the machine, is held in oil-lubricated sliding-contact with a bearing said rotor shaft being provided, in the bearing part being provided with an outer casing having a cylindrical outer surface which forms, in the region of the bearing part, an outer surface of the rotor shaft, the outer casing comprising a separate, one-piece cylindrical sleeve arranged directly on a portion of the rotor shaft situated inside the sleeve and forming a structural unity therewith, a contact surface being formed between the sleeve and the portion of the rotor shaft situated inside the sleeve, the contact surface having a cylindrical shape, the cylindrical sleeve forming a thermally insulating layer between the outer surface of the sleeve and the portion of the rotor shaft situated inside the sleeve.

8. The rotary machine of claim 7, wherein the sleeve has a larger internal diameter in an axially central region than in a region of the ends, so that a chamber is formed between the sleeve and the portion of the rotor shaft situated inside the sleeve.

9. The rotary machine of claim 7, wherein the portion of the rotor shaft situated inside the sleeve located at an axially central region of the sleeve has a smaller diameter than in a region of the ends of the sleeve, so that a chamber is formed between the sleeve and the portion of the rotor shaft situated inside the sleeve.

10. The rotary machine of claim 8, wherein the sleeve is shrunk onto the portion of the rotor shaft situated inside the sleeve in the region of the ends thereof to form a shrunk connection at each of the ends.

11. The rotory machine of claim 10, wherein the shrunk connection at one end of the sleeve is tighter than the shrunk connection at the other end.

12. The rotory machine of claim 2, wherein the sleeve is made from the same material as the rotor shaft.

* * * * *